(12) United States Patent
Pirkl et al.

(10) Patent No.: US 11,542,902 B2
(45) Date of Patent: Jan. 3, 2023

(54) CONNECTING PIECE FOR A FUEL INJECTOR OF AN INTERNAL COMBUSTION ENGINE

(71) Applicant: LIEBHERR-COMPONENTS DEGGENDORF GMBH, Deggendorf (DE)

(72) Inventors: Richard Pirkl, Regensburg (DE); Razvan-Sorin Stinghe, Hengersberg (DE); Wolfgang Melder, Regensburg (DE); Markus Hoellbacher, Puch (DE)

(73) Assignee: LIEBHERR-COMPONENTS DEGGENDORF GMBH, Deggendorf (DE)

( * ) Notice: Subject to any disclaimer, the term of this patent is extended or adjusted under 35 U.S.C. 154(b) by 0 days.

(21) Appl. No.: 17/263,523

(22) PCT Filed: Jul. 24, 2019

(86) PCT No.: PCT/EP2019/069951
§ 371 (c)(1),
(2) Date: Jan. 26, 2021

(87) PCT Pub. No.: WO2020/020961
PCT Pub. Date: Jan. 30, 2020

(65) Prior Publication Data
US 2021/0231087 A1 Jul. 29, 2021

(30) Foreign Application Priority Data
Jul. 26, 2018 (DE) .................... 10 2018 118 120.5

(51) Int. Cl.
*F02M 55/02* (2006.01)
*F02M 61/16* (2006.01)
(Continued)

(52) U.S. Cl.
CPC ........ *F02M 55/025* (2013.01); *F02M 61/165* (2013.01); *F15B 1/04* (2013.01);
(Continued)

(58) Field of Classification Search
CPC .................................................... F16L 41/021
See application file for complete search history.

(56) References Cited

U.S. PATENT DOCUMENTS

| 5,666,922 A * | 9/1997 | Krimmer | F02M 55/02 |
| | | | 123/470 |
| 6,851,412 B2 * | 2/2005 | Jay | F02M 63/0225 |
| | | | 123/456 |

(Continued)

FOREIGN PATENT DOCUMENTS

| AT | 501851 A1 * | 11/2006 | ........... F02M 55/005 |
| AT | 501851 B1 * | 5/2008 | ........... F02M 55/005 |

(Continued)

OTHER PUBLICATIONS

ISA European Patent Office, International Search Report Issued in Application No. PCT/EP2019/069951, dated Sep. 26, 2019, WIPO, 4 pages.

(Continued)

*Primary Examiner* — Kevin R Steckbauer
(74) *Attorney, Agent, or Firm* — McCoy Russell LLP

(57) ABSTRACT

The invention relates to a connecting piece for a fuel injector of an internal combustion engine comprising at least one high-pressure input port and at least one high-pressure output port, wherein the high-pressure input port and the high-pressure output port open into an internal high-pressure accumulator of the connecting piece and/or the injector via separate high-pressure feed channels.

15 Claims, 3 Drawing Sheets

(51) Int. Cl.
  *F15B 1/04* (2006.01)
  *F16L 55/027* (2006.01)
  *F16L 41/02* (2006.01)
(52) U.S. Cl.
  CPC .......... *F16L 41/021* (2013.01); *F16L 55/027* (2013.01); *F02M 2200/28* (2013.01); *F02M 2200/40* (2013.01); *F02M 2200/85* (2013.01)

(56) References Cited

U.S. PATENT DOCUMENTS

| | | | | |
|---|---|---|---|---|
| 7,025,045 | B2 * | 4/2006 | Hlousek | F02M 55/025 |
| | | | | 123/467 |
| 7,874,283 | B2 * | 1/2011 | Farrow | F16L 41/021 |
| | | | | 123/470 |
| 8,733,324 | B2 * | 5/2014 | Blizard | F02M 55/02 |
| | | | | 123/468 |
| 8,939,128 | B2 * | 1/2015 | Pirkl | F02M 61/168 |
| | | | | 123/470 |
| 9,488,305 | B2 * | 11/2016 | Sato | F16L 41/021 |
| 9,587,611 | B2 * | 3/2017 | Ganser | F02M 55/001 |
| 9,689,515 | B2 * | 6/2017 | Seong | F02M 55/004 |
| 9,951,737 | B2 * | 4/2018 | Wagner | F02M 63/0285 |
| 9,964,083 | B2 * | 5/2018 | Eklund | F02M 55/02 |
| 10,364,781 | B2 * | 7/2019 | Carboni | F02M 61/14 |
| 10,473,074 | B2 * | 11/2019 | Frouin | B29C 33/306 |
| 2003/0230284 | A1 * | 12/2003 | Jay | F02M 55/025 |
| | | | | 123/456 |
| 2004/0187848 | A1 * | 9/2004 | Hlousek | F02M 63/0225 |
| | | | | 123/456 |
| 2009/0194073 | A1 * | 8/2009 | Farrow | F02M 61/145 |
| | | | | 123/470 |
| 2010/0013219 | A1 * | 1/2010 | Hlousek | F02M 55/005 |
| | | | | 285/341 |
| 2011/0214643 | A1 * | 9/2011 | Blizard | F02M 53/02 |
| | | | | 123/468 |
| 2011/0271935 | A1 * | 11/2011 | Pirkl | F02M 61/168 |
| | | | | 123/470 |
| 2011/0297125 | A1 * | 12/2011 | Shafer | F02M 55/02 |
| | | | | 123/456 |
| 2013/0092131 | A1 * | 4/2013 | Graspeuntner | F02M 69/46 |
| | | | | 123/456 |
| 2013/0340711 | A1 * | 12/2013 | Wagner | F02M 63/0265 |
| | | | | 123/447 |
| 2014/0000562 | A1 * | 1/2014 | Eklund | F02M 65/006 |
| | | | | 123/447 |
| 2015/0028580 | A1 * | 1/2015 | Sato | F16L 41/021 |
| | | | | 285/130.1 |
| 2016/0018035 | A1 * | 1/2016 | Seong | F16L 37/133 |
| | | | | 285/34 |
| 2017/0045024 | A1 * | 2/2017 | Carboni | F02M 55/004 |
| 2017/0336008 | A1 * | 11/2017 | Hankins | B29C 66/52292 |
| 2019/0040829 | A1 * | 2/2019 | Frouin | B29C 45/2675 |
| 2020/0332751 | A1 * | 10/2020 | Hwang | F02M 55/025 |
| 2021/0231087 | A1 * | 7/2021 | Pirkl | F16L 55/027 |

FOREIGN PATENT DOCUMENTS

| | | | | |
|---|---|---|---|---|
| AT | 509332 | A4 * | 8/2011 | ........... F02M 55/005 |
| AT | 509332 | B1 * | 8/2011 | ........... F02M 55/005 |
| AT | 518510 | A2 * | 10/2017 | ............ F02M 47/02 |
| AT | 518510 | B1 * | 7/2018 | ............ F02M 47/02 |
| CH | 702496 | B1 * | 7/2011 | ........... F02M 47/027 |
| CH | 712276 | A1 * | 9/2017 | ............ F02M 47/02 |
| CH | 712276 | B1 * | 3/2020 | ............ F02M 47/02 |
| CN | 101099061 | A * | 1/2008 | ........... F02M 55/005 |
| CN | 101099061 | B * | 6/2010 | ........... F02M 55/005 |
| CN | 102667134 | A | 9/2012 | |
| CN | 103038494 | A * | 4/2013 | ........... F02M 55/005 |
| CN | 103370529 | A * | 10/2013 | ......... F02M 37/0017 |
| CN | 103038494 | B * | 10/2015 | ........... F02M 55/005 |
| CN | 103370529 | B * | 1/2016 | ......... F02M 37/0017 |
| CN | 109070394 | A * | 12/2018 | ........... B29C 33/306 |
| CN | 110234865 | A * | 9/2019 | ........... F02M 55/025 |
| CN | 109070394 | B * | 12/2020 | ........... B29C 33/306 |
| CN | 112267964 | A * | 1/2021 | |
| CN | 112377344 | A * | 2/2021 | ......... F02D 41/3863 |
| CN | 112513451 | A * | 3/2021 | ........... F02M 55/025 |
| DE | 10101476 | A1 * | 7/2002 | ........... F02M 55/005 |
| DE | 10101476 | A1 | 7/2002 | |
| DE | 10210282 | A1 * | 9/2003 | ........... F02M 47/027 |
| DE | 10322603 | A1 * | 12/2004 | ........... F02M 55/004 |
| DE | 10360334 | A1 * | 7/2005 | ........... F02M 55/002 |
| DE | 102008001743 | A1 | 11/2009 | |
| DE | 102008001743 | A1 * | 11/2009 | ........... F02M 55/002 |
| DE | 102011005096 | A1 * | 9/2012 | ........... F02M 55/025 |
| DE | 10322603 | B4 * | 4/2013 | ........... F02M 55/004 |
| DE | 102017201262 | A1 * | 9/2017 | ............ F02M 47/02 |
| DE | 102017201262 | A1 | 9/2017 | |
| DE | 102018118120 | A1 * | 1/2020 | ........... F02M 55/025 |
| DE | 102019216166 | A1 * | 4/2021 | ............. B33Y 80/00 |
| EP | 1353063 | A2 * | 10/2003 | ........... F02M 55/025 |
| EP | 1485609 | B1 * | 11/2005 | ........... F02M 47/027 |
| EP | 1774217 | A1 * | 4/2007 | ........... F02M 55/005 |
| EP | 1706632 | B1 * | 3/2009 | ........... F02M 55/002 |
| EP | 1774217 | B1 * | 4/2009 | ........... F02M 55/005 |
| EP | 1904741 | B1 * | 11/2010 | ............. E02F 3/3613 |
| EP | 2585706 | A1 * | 5/2013 | ........... F02M 55/005 |
| EP | 2673494 | A2 * | 12/2013 | ......... F02M 37/0017 |
| EP | 2673494 | B1 * | 11/2015 | ......... F02M 37/0017 |
| EP | 3411209 | A1 * | 12/2018 | ........... B29C 33/306 |
| EP | 3411209 | B1 * | 12/2019 | ........... B29C 33/306 |
| EP | 3805547 | A1 * | 4/2021 | |
| EP | 3827166 | A1 * | 6/2021 | ........... F02M 55/025 |
| EP | 3571387 | B1 * | 7/2021 | ........... F02M 55/025 |
| FR | 2721088 | A1 * | 12/1995 | ........... F02M 55/002 |
| FR | 3047434 | A1 * | 8/2017 | ........... B29C 33/306 |
| FR | 3047434 | B1 * | 9/2018 | ........... B29C 33/306 |
| FR | 3061934 | B1 * | 6/2019 | ........... F02M 55/025 |
| JP | 5859574 | B2 * | 2/2016 | ......... F02M 37/0017 |
| JP | 5932784 | B2 * | 6/2016 | ........... F02M 55/005 |
| JP | 6855582 | B2 * | 4/2021 | ........... F02M 55/025 |
| RU | 2341718 | C1 * | 12/2008 | ........... F02M 55/005 |
| WO | WO-03076794 | A1 * | 9/2003 | ........... F02M 47/027 |
| WO | WO-2006010182 | A1 * | 2/2006 | ........... F02M 55/005 |
| WO | WO-2007009279 | A1 * | 1/2007 | ............. E02F 3/3613 |
| WO | WO-2011085858 | A1 * | 7/2011 | ............. F02M 55/02 |
| WO | WO-2011153119 | A2 * | 12/2011 | ............. F02M 55/02 |
| WO | WO-2011160148 | A1 * | 12/2011 | ........... F02M 55/005 |
| WO | WO-2011153119 | A3 * | 1/2012 | ............. F02M 55/02 |
| WO | WO-2012107633 | A2 * | 8/2012 | ......... F02M 37/0017 |
| WO | WO-2012107633 | A3 * | 3/2013 | ......... F02M 37/0017 |
| WO | WO-2017134180 | A1 * | 8/2017 | ........... B29C 33/306 |
| WO | WO-2018134144 | A1 * | 7/2018 | ........... F02M 55/025 |
| WO | WO-2020020961 | A1 * | 1/2020 | ........... F02M 55/025 |
| WO | WO-2021078447 | A1 * | 4/2021 | ............. B33Y 80/00 |

OTHER PUBLICATIONS

State Intellectual Property Office of the People's Republic of China, Office Action and Search Report Issued in Application No. 201980049844.6, dated Jun. 9, 2022, 12 pages. (Submitted with Partial Translation).

* cited by examiner

CONNECTING PIECE FOR A FUEL INJECTOR OF AN INTERNAL COMBUSTION ENGINE

CROSS REFERENCE TO RELATED APPLICATIONS

The present application is a U.S. National Phase of International Application No. PCT/EP2019/069951 entitled "CONNECTION PIECE FOR A FUEL INJECTOR IN AN INTERNAL COMBUSTION ENGINE," and filed on Jul. 24, 2019. International Application No. PCT/EP2019/069951 claims priority to German Patent Application No. 10 2018 118 120.5 filed on Jul. 26, 2018. The entire contents of each of the above-listed applications are hereby incorporated by reference for all purposes.

TECHNICAL FIELD

This invention relates to a connecting piece for a fuel injector of an internal combustion engine. Such connecting pieces provide at least one high-pressure input port and at least one high-pressure output port.

BACKGROUND AND SUMMARY

In known injection systems for internal combustion engines, in particular the common-rail injection, the fuel is brought to the required pressure level by a central high-pressure pump. The pressurized fuel is distributed to the individual fuel injectors via a common pipe system.

Here, two possibilities for fuel distribution become apparent, namely a pipe system with a parallel or series connection of the individual injectors. In the first variant, the individual injectors are connected in parallel to a common distribution pipe of the high-pressure line. The second variant provides a supply of the fuel from a high-pressure pump to a first injector from which the fuel is passed on to the subsequent injector. For such an interconnection, each injector must include at least two high-pressure ports, one of which is used as input and one is used as output.

A general problem of such common-rail injection systems, in particular in series connections, consists in that pressure waves generated by the high-pressure pump can propagate into the injectors via the fuel lines and impair the uniform fuel flow desired there. Therefore, it is desirable to eliminate or at least attenuate the propagation of the triggered pressure pulsations of the high-pressure pump by suitable measures.

This object is achieved by a connecting piece for a fuel injector of an internal combustion engine according to the features of claim 1. Advantageous embodiments of the connecting piece are subject-matter of the dependent claims.

Due to the at least two high-pressure ports, the generic connecting piece is suitable for establishing a series connection comprising a plurality of fuel injectors. One port here serves as a high-pressure input port and at least one second port serves as a high-pressure output port.

According to the invention, it is proposed to provide separate high-pressure channels within the connecting piece for the high-pressure ports, i.e. the at least one high-pressure input port and the at least one high-pressure output port, via which high-pressure channels the respective ports separately open within an internal high-pressure accumulator. An essential aspect here is the fact that the ports, i.e. the at least one high-pressure input port and the at least one high-pressure output port only indirectly are in fluid connection with each other via the internal high-pressure accumulator.

As a result, possible pressure pulsations within the high-pressure lines can be eliminated or sufficiently attenuated by means of the internal high-pressure accumulator so that forwarding of these fluctuations from a first injector of the series connection to at least one downstream injector is inhibited or at least reduced.

It is advantageous when the internal high-pressure accumulator is part of the connecting piece or is at least partly formed within the connecting piece. Alternatively, however, an existing high-pressure accumulator might also be used within a connected injector in which the high-pressure channels of the connecting piece open separately from each other. For this purpose, the high-pressure channels hence are separately guided to the interface of the connecting piece with the injector, where they then open separately into the internal high-pressure accumulator of the injector.

According to an advantageous aspect of the invention, a throttle is additionally installed in the high-pressure feed channel from the high-pressure input port up to the internal high-pressure accumulator. The same can also be provided in the high-pressure feed channel from the high-pressure output port to the high-pressure accumulator. What hence is imaginable is a variant in which a throttle is provided in merely one of the two high-pressure feed channels, but a configuration with an integrated throttle in both high-pressure feed channels is preferred.

By using at least one throttle within at least one of these high-pressure feed channels, the above-mentioned pressure pulsations within the high-pressure lines can be attenuated even more strongly. Such a throttle can be implemented by a defined diameter taper of the respective high-pressure feed channel. What is expedient is a taper of the diameter in the direction of the high-pressure accumulator.

By way of precaution it is pointed out that the use of such a throttle in at least one of the high-pressure feed channels is advantageous, but does not constitute an absolutely necessary prerequisite for a successful implementation of the invention and therefore merely forms an optional feature of the invention.

The constructional design of the connecting piece or the concrete shape is not limited in principle. What is found to be advantageous, however, is a symmetrical, in particular axially symmetrical design of the connecting piece. What is conceivable is the configuration as a T-shaped connecting piece or T-piece, wherein both the high-pressure input port and the high-pressure output port are formed at the head area of the T-piece. The foot of the T-shaped connecting piece forms the interface to the injector.

The internal high-pressure accumulator can be formed within the T-piece as a longitudinal bore in the direction of the foot of the T-piece. Ideally, the high-pressure feed channels open at right angles to the longitudinal axis of the bore of the high-pressure accumulator.

The connection of external high-pressure lines to the high-pressure input port or the high-pressure output port can be effected in a releasable manner. Ideally, the high-pressure input port and/or the high-pressure output port comprises a thread for the screw connection of an external high-pressure line. Particularly preferably, this is an external thread which is provided on the outside of the connection of the high-pressure input port or high-pressure output port.

The assembly of the connecting piece with the injector can likewise be effected by means of a releasable connection. Here as well, a screw connection of connecting piece and injector housing, in particular by means of one or more clamping nuts, is found to be advantageous. It should be noted that the connecting piece need not necessarily be a component to be separated from the injector or injector housing. It is furthermore conceivable that the connecting piece is part of the injector housing, i.e. formed by a portion of the injector/injector housing. Theoretically, it is also imaginable that the injector/injector housing and the connecting piece are formed from a one-part basic component. The interface mentioned above then is only a theoretical interface between the two areas of the one-part component.

Furthermore, it can be provided that the connecting piece provides at least one internal filter which forms the fluid connection between the internal high-pressure accumulator of the connecting piece and the injector receiving the connecting piece. According to a preferred embodiment, there is provided a corresponding filter housing which serves to receive the filter, wherein the filter housing forms the corresponding connection interface of the internal high-pressure accumulator with an injector.

Beside the inventive connecting piece, the present invention also relates to a fuel injector with at least one connecting piece according to the present invention. Accordingly, the fuel injector has the same advantages and properties as they have already been explained above with reference to the connecting piece. In particular, a corresponding injector also comprises such an embodiment in which the internal high-pressure accumulator for connecting the high-pressure input port and/or high-pressure output port is partly or completely integrated within the fuel injector housing. In such a case, the high-pressure feed channels of the connecting piece end at the interface to the injector separately from each other. The injector includes forwarding channels in its corresponding interface area, whereby the high-pressure feed channels ultimately can open into the internal high-pressure accumulator separately from each other.

Moreover, the invention also relates to an injection system comprising a plurality of injectors according to the present invention, wherein the same are connected to each other in series via their connecting pieces.

Finally, the invention also relates to a machine comprising an internal combustion engine and an injection system according to the present invention. Accordingly, the same advantages and properties as they have been indicated already in conjunction with the explanations of the connecting piece of the invention are obtained both for the injection system and for the machine.

BRIEF DESCRIPTION OF THE FIGURES

Further advantages and properties of the invention will be explained in detail with reference to the exemplary embodiments illustrated in the Figures, in which.

DETAILED DESCRIPTION

Figure 1:
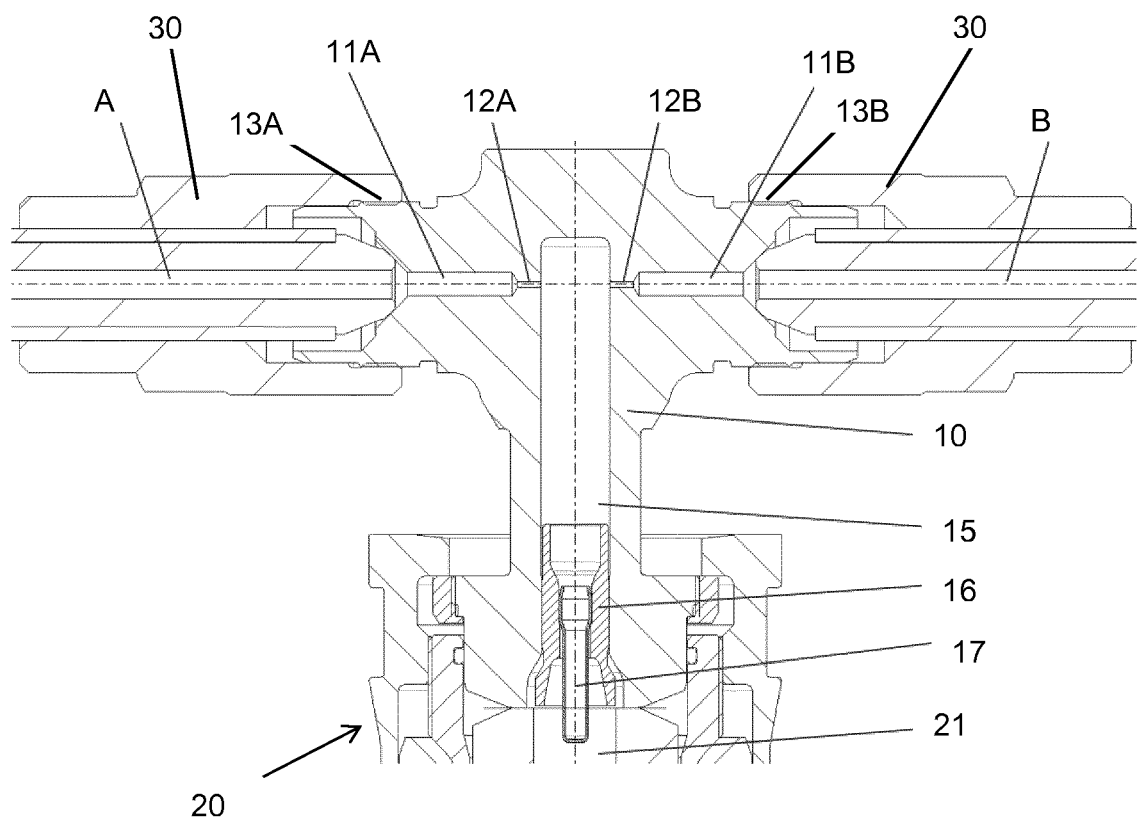
FIG. 1: shows a sectional representation through the fuel injector of the invention in the area of the connecting piece according to a first embodiment.

The sectional representation of FIG. 1 shows the axially symmetrical T-shaped connecting piece 10 which on its foot side is connected to the injector housing 20 by means of a screw connection. At the head area of the connecting piece 10, the ports for high-pressure lines A,B are formed on opposite sides. For example, the high-pressure line A is connected to the high-pressure input port by screwing the union nut 30 to the external thread 13A provided at the connecting flange. The high-pressure line A thereby is axially pressed into the opening of the high-pressure input port. The same is done with the high-pressure line B, which likewise is screwed to the external thread 13B provided at the high-pressure output port by means of a union nut 30. Accordingly, a series connection of injectors 20 for an injection system of an internal combustion engine can be established by means of such connecting pieces 10, without any additional connection components, such as e.g. a clamp or the like, being necessary.

From each of the two high-pressure ports, an individual high-pressure feed channel 11A, 11B extends, which extends in an axial connection direction from the high-pressure input port or high-pressure output port to an internal high-pressure accumulator 15 and opens into the same. The high-pressure accumulator 15 extends transversely to the direction of the feed channels 11A, 11B, i.e. in the vertical direction up to the foot of the connecting piece 10.

Both the high-pressure feed channel 11A and the high-pressure feed channel 11B each provide an integrated throttle 12A,12B which is characterized by a taper of the channel diameter of the respective high-pressure feed channel 11A, 11B in the direction of the integrated high-pressure accumulator 15. In the illustrated embodiment, both throttles 12A, 12B open directly into the integrated pressure accumulator 15, but theoretically the throttles 12A, 12B might be located in a portion of the high-pressure feed channel 11A, 11B located further centrally.

Due to the fact that the high-pressure line A is merely indirectly connected to the outgoing high pressure line B via the integrated high-pressure accumulator 15, it is ensured that the pressure pulsations caused by a central high-pressure pump are eliminated or at least massively attenuated and cannot be transmitted to a connected further injector via the high-pressure channel 11B or the high-pressure line B. The integrated throttles 12A, 12B contribute to a further elimination or attenuation of the pressure waves caused by the pump.

Figure 2:
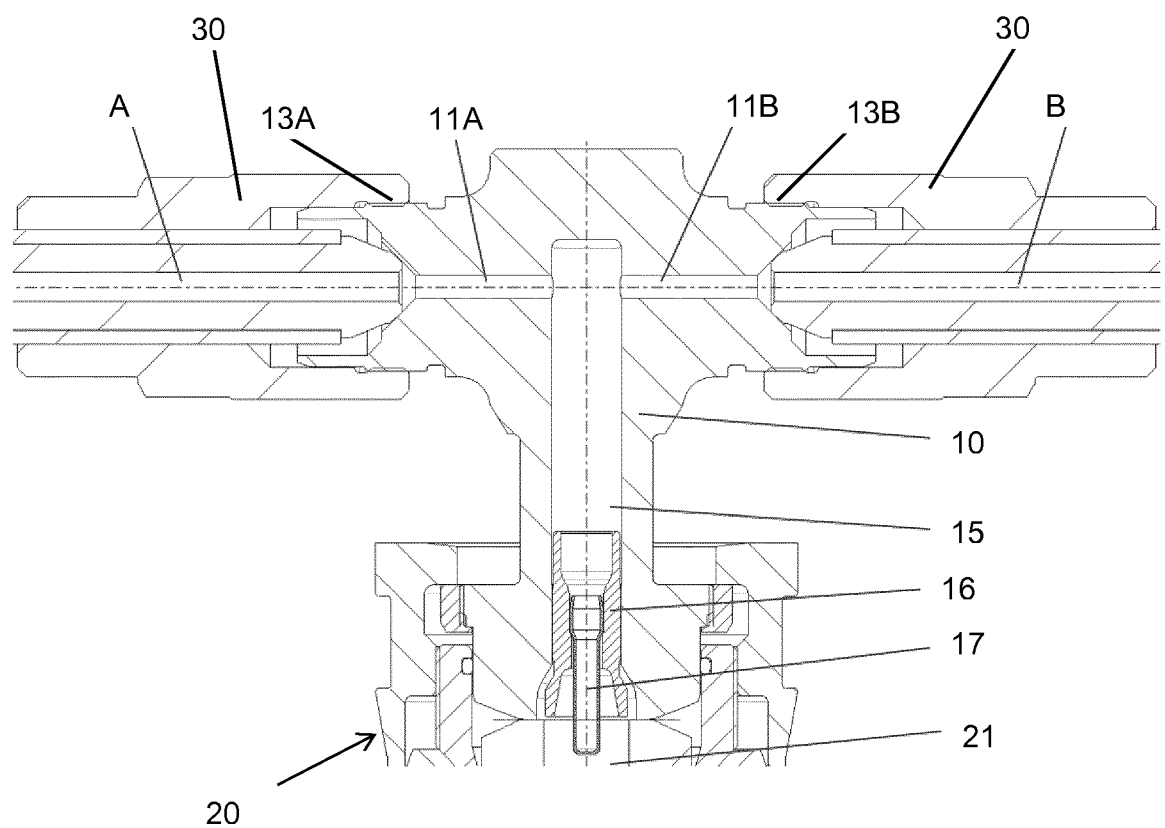
FIG. 2: shows a sectional representation of a modified fuel injector according to the invention, which is analogous to FIG. 1, FIG. 3: shows a schematic representation of the injection system according to the invention with fuel injectors as shown in FIG. 1 or FIG. 2.

The embodiment of FIG. 2 shows a slightly modified variant of the connecting piece 10, which differs from the variant of FIG. 1 merely by the fact that the throttles 12A, 12B contained in FIG. 1 have been omitted, and the diameter of the high-pressure feed channels 11A, 11B hence remains constant along its length. In this case, only the pressure accumulator 15 ensures a sufficient elimination or attenuation of possible pressure pulsations in the high-pressure line A.

In both exemplary embodiments (FIGS. 1 and 2) the fluid interface of the connecting piece 10 with the injector 20 is formed via the integrated filter 17 which is received by a filter housing 16. The filter housing 16 is inserted into the opening of the high-pressure accumulator 15 directed towards the interface. The filter housing 16 is level with the opening of the high-pressure accumulator 15, while the filter element 17 protrudes from the opening by a short piece.

The high-pressure accumulator 21 of the injector shows a diameter different from the high-pressure accumulator 15 of the connecting piece 10, at least with respect to its opening diameter. Connecting piece 10 and injector 20 are connected to each other such that the two high-pressure accumulators 15, 21 and their openings are level with each other. The protruding filter element 17 of the connecting piece 10 protrudes into the high-pressure accumulator 21 of the injector.

Figure 3:
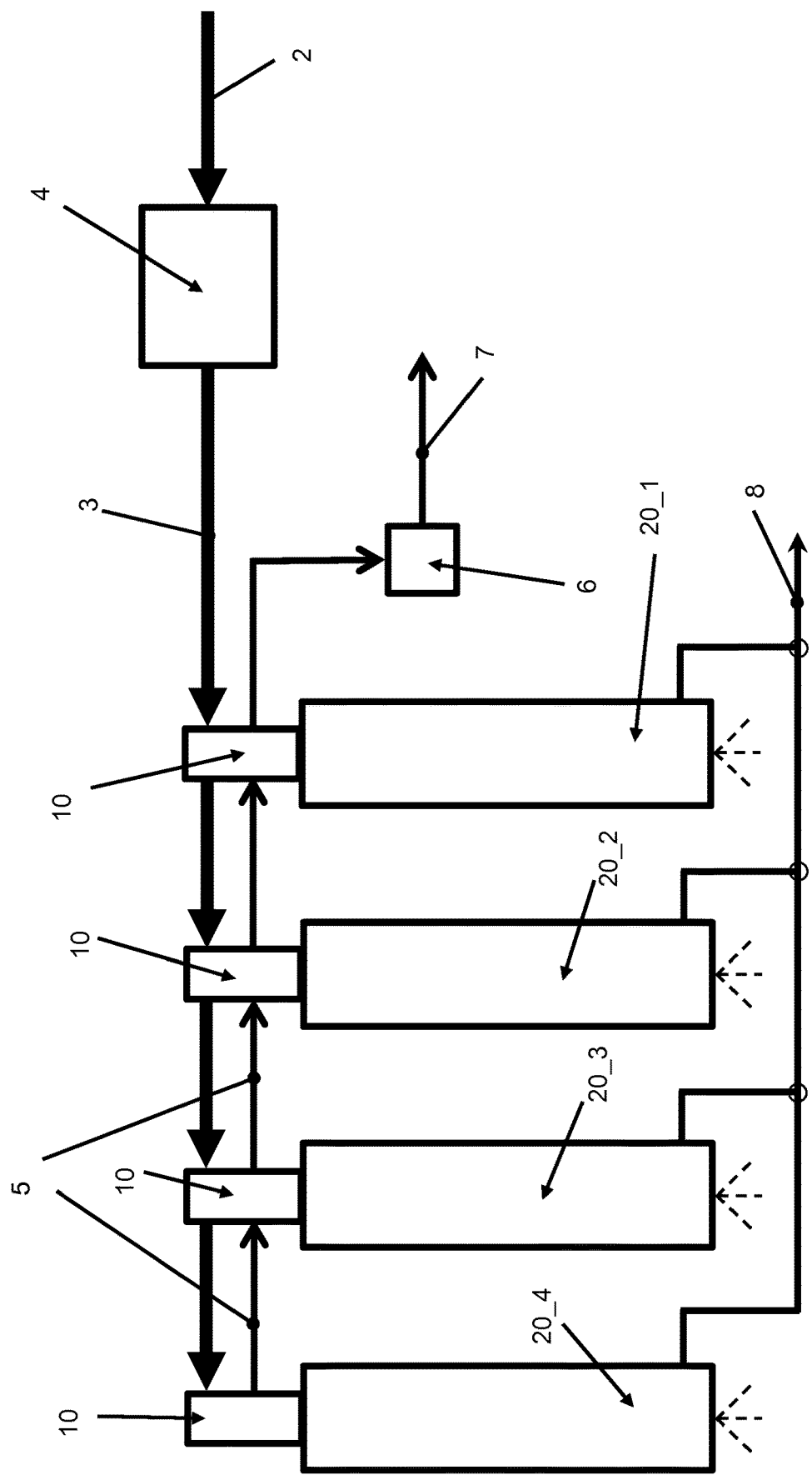

FIG. 3 shows a schematic circuitry of the injection system according to the invention with a total of four fuel injectors 20_1, 20_2, 20_3, 20_4, which each carry the connecting piece 10 according to the invention at the head-side end of the housing. The central fuel supply is designated with the reference numeral 2. The fuel is brought to the required pressure level by means of the central high-pressure pump 4, which pressure level is provided to the first injector 20_1 of the series connection via the fuel supply line 3. The supply line 3 therefor is mounted on the high-pressure input port of the connecting piece 10 of the first injector 20_1. Via the high-pressure output port of the connecting piece 10, the fuel then flows on to the subsequent injector 20_2 or the high-pressure input port of the associated connecting piece 10 present there. The output of the injector 20_2 in turn is connected to the input of the subsequent injector 20_3, from where the fuel ultimately flows to the last injector 20_4. The high-pressure output port of the fourth and hence last fuel injector 20_4 is sealingly closed by means of an appropriate sealing plug.

Optionally, a further fuel outlet 5 can be provided in the area of the connecting pieces 10, via which fracture leakages can be recirculated into the fuel tank 7. A corresponding sensor 6 serves to detect possible fracture leakages. Furthermore, the fuel outlet 8 ensures the discharge of possible switching leakages from the injectors 20_1-20_4.

The invention claimed is:

1. A connecting piece for a fuel injector of an internal combustion engine comprising:
   a high-pressure input port and a high-pressure output port,
   an internal high-pressure accumulator extending along a longitudinal axis within the connecting piece, and the internal high-pressure accumulator having a top side, first side, and second side,
   a first high-pressure feed channel formed in the connecting piece, the first high-pressure feed channel opens into the first side of the internal high-pressure accumulator at a distance below the top side of the internal high-pressure accumulator and the high-pressure input port connected to the first high-pressure feed channel,
   a second high-pressure feed channel formed in the connecting piece, the first high-pressure feed channel opens into the second side of the internal high-pressure accumulator at a distance below the top side of the internal high-pressure accumulator and the high-pressure output port connected to the second separate high-pressure feed channel, and
   an internal volume of the internal high-pressure accumulator oriented along the longitudinal axis and having a greater volume than a volume of the high-pressure feed channels, the internal volume positioned between the first high-pressure feed channel and the second high-pressure feed channel such that flow along from the first high-pressure feed channel oriented on a lateral axis must enter the larger volume of the internal high-pressure accumulator oriented on the longitudinal axis before entering the second high-pressure feed channel oriented on the lateral axis.

2. The connecting piece according to claim 1, wherein the high-pressure feed channel of the high-pressure input port and/or the high-pressure feed channel of the high-pressure output port include at least one throttle.

3. The connecting piece according to claim 1, wherein the high-pressure feed channel of the high-pressure input port and the high-pressure feed channel of the high-pressure output port open directly into the internal high-pressure accumulator of the connecting piece without a throttle.

4. The connecting piece according to claim 1, wherein the connecting piece is of axially symmetrical design.

5. The connecting piece according to claim 2, wherein the high-pressure input port and/or the high-pressure output port provide a thread for the screw connection of an external high-pressure line and the threads are positioned an exterior of the connecting piece.

6. The connecting piece according to claim 1, wherein the connecting piece is designed T-shaped or as a T-piece, wherein the high-pressure ports are formed in the head area and the interface to a fuel injector housing is formed by the foot of the T-piece, wherein the internal high-pressure accumulator of the connecting piece extends in the axial direction to the interface of the T-piece, and the high-pressure feed channels open into the high-pressure accumulator at right angles to its longitudinal extension.

7. The connecting piece according to claim 1, wherein there is provided a filter housing with a filter received therein, wherein the filter housing or the filter forms the connection interface of the internal high-pressure accumulator with a fuel injector.

8. A fuel injector with at least one connecting piece according to claim 1.

9. An injection system comprising a plurality of injectors according to claim 8, which are connected in series via their connecting pieces.

10. A machine comprising an internal combustion engine and an injection system according to claim 9.

11. The connecting piece according to claim 2, wherein at least one throttle is in the form of a defined diameter taper of the respective high-pressure feed channel in the direction of the internal high-pressure accumulator.

12. The connecting piece according to claim 5, wherein the thread for the screw connection of the external high-pressure line is in the form of a thread provided on the outside of a connecting flange of the high-pressure input port or the high-pressure output port.

13. The connecting piece according to claim 1, wherein the internal high-pressure accumulator is oriented along a central axis of the fuel injector, the first high-pressure feed channel extends radially from the first side of the internal high-pressure accumulator, and the second high-pressure feed channel extends radially from the second side of the internal high-pressure accumulator.

14. The connecting piece according to claim 1, wherein the first high-pressure feed channel and the second first high-pressure feed channel are only connected through the internal volume of the internal high-pressure accumulator.

15. The connecting piece according to claim 1, wherein the internal high-pressure accumulator outputs fluid to an accumulator of a fuel injector.

* * * * *